(12) United States Patent
Shaffer et al.

(10) Patent No.: US 9,080,074 B2
(45) Date of Patent: Jul. 14, 2015

(54) LOW TEMPERATURE CURING POLYURETDIONE COMPOSITIONS

(75) Inventors: Myron W. Shaffer, New Cumberland, WV (US); Abdullah Ekin, Imperial, PA (US); Carol L. Kinney, Eighty Four, PA (US); Dorota Greszta-Franz, Solingen (DE); Jonathan T. Martz, Glenshaw, PA (US); Jun Deng, Murrysville, PA (US); Deborah E. Hayes, Verona, PA (US); Stephen J. Thomas, Aspinwall, PA (US)

(73) Assignees: Bayer MaterialScience LLC, Pittsburgh, PA (US); Bayer MaterialScience AG, Leverkusen (DE); PPG, Inc., Pittsburgh, PA (US)

( * ) Notice: Subject to any disclaimer, the term of this patent is extended or adjusted under 35 U.S.C. 154(b) by 604 days.

(21) Appl. No.: 12/727,295

(22) Filed: Mar. 19, 2010

(65) Prior Publication Data
US 2011/0229645 A1 Sep. 22, 2011

(51) Int. Cl.
*C08L 75/00* (2006.01)
*C08G 18/08* (2006.01)
*C08G 18/62* (2006.01)
*C08G 18/20* (2006.01)
*C08G 18/18* (2006.01)
*C08G 18/16* (2006.01)
*C08G 18/10* (2006.01)
*C08G 18/24* (2006.01)
*C08G 18/79* (2006.01)
*C09D 175/14* (2006.01)
*C08G 18/44* (2006.01)
*C08G 18/42* (2006.01)

(52) U.S. Cl.
CPC .............. *C09D 175/14* (2013.01); *C08G 18/10* (2013.01); *C08G 18/168* (2013.01); *C08G 18/1883* (2013.01); *C08G 18/2027* (2013.01); *C08G 18/2063* (2013.01); *C08G 18/244* (2013.01); *C08G 18/42* (2013.01); *C08G 18/44* (2013.01); *C08G 18/6225* (2013.01); *C08G 18/798* (2013.01)

(58) Field of Classification Search
CPC ...... C08G 18/10; C08G 18/74; C08G 18/798; C08G 18/1858; C08G 18/2073; C09D 175/14
USPC ................................ 524/589, 590
See application file for complete search history.

(56) References Cited

U.S. PATENT DOCUMENTS

| | | | |
|---|---|---|---|
| 3,124,605 A | 3/1964 | Wagner | |
| 3,152,162 A | 10/1964 | Fischer et al. | |
| 3,169,949 A | 2/1965 | Büning | |
| 3,358,010 A | 12/1967 | Britain | |
| 3,644,490 A | 2/1972 | Schmelzer et al | |
| 3,862,973 A | 1/1975 | Dietrich et al. | |
| 3,903,127 A | 9/1975 | Wagner et al. | |
| 3,906,126 A | 9/1975 | Kaiser et al. | |
| 4,051,165 A | 9/1977 | Wagner et al. | |
| 4,088,665 A | 5/1978 | Findeisen et al. | |
| 4,147,714 A | 4/1979 | Hetzel et al. | |
| 4,220,749 A | 9/1980 | Reichmann et al. | |
| 4,288,586 A | 9/1981 | Bock et al. | |
| 4,294,719 A | 10/1981 | Wagner et al. | |
| 4,324,879 A | 4/1982 | Bock et al. | |
| 4,344,855 A | 8/1982 | Schäfer et al. | |
| 4,419,513 A | 12/1983 | Breidenbach et al. | |
| 5,756,634 A | 5/1998 | Braunstein et al. | |
| 5,814,689 A | 9/1998 | Goldstein et al. | |
| 5,847,044 A * | 12/1998 | Laas et al. ..................... | 524/590 |
| 5,861,193 A | 1/1999 | Goldstein et al. | |
| 5,874,173 A | 2/1999 | Wenning | |
| 5,914,383 A | 6/1999 | Richter et al. | |
| 6,423,777 B1 * | 7/2002 | Laas et al. ..................... | 525/127 |
| 6,849,705 B2 | 2/2005 | Wenning | |
| 6,875,800 B2 | 4/2005 | Vanier et al. | |
| 8,894,086 B2 | 5/2005 | Munro et al. | |
| 7,605,194 B2 | 10/2009 | Ferencz et al. | |
| 7,709,589 B2 | 5/2010 | Spyrou et al. | |
| 2005/0287348 A1 | 12/2005 | Faler et al. | |
| 2007/0266897 A1 | 11/2007 | Spryou | |
| 2008/0194787 A1 | 8/2008 | Weiss et al. | |

OTHER PUBLICATIONS

Gedan-Smolka, Michaela et. al., New Catalysts for the Low Temperature Curing of Uretdione Powder Coatings, International Waterborne, High-Solids, and Powder Coatings Symposium, Feb. 21-23, 2001, pp. 405-419.

* cited by examiner

*Primary Examiner* — Aiqun Li
(74) *Attorney, Agent, or Firm* — Robert S. Klemz

(57) ABSTRACT

Composition and process for low temperature curing of polyuretdione-polyol compositions in which the polyuretdione is prepared from a polyisocyanate with isocyanate groups and a polyol containing primary hydroxyl groups. The catalyst for the composition and process is an amine catalyst containing the group —N═C—N—, being aprotic, having a pKa greater than 20 and upon addition to the liquid coating composition causing a phase-change of the coating composition from liquid to solid at 25° C. and 1 atm. within one week.

14 Claims, No Drawings

LOW TEMPERATURE CURING POLYURETDIONE COMPOSITIONS

FIELD OF THE INVENTION

The present invention relates to curable polyuretidione compositions and more particularly to polyuretidione-polyol compositions that cure at low temperatures. The invention also relates to a coating process using the polyuretidione-polyol compositions with a low temperature curing step.

BACKGROUND OF THE INVENTION

Polyisocyanates are well known low temperature curing agents for active hydrogen containing polymers such as polymeric polyols. However, special equipment must be used when handling the polyisocyanates and more particularly when handling curable compositions containing the polyisocyanates. The handling problems can be dealt with by blocking the polyisocyanates with a blocking agent such as a low molecular weight alcohol to form urethanes. However, high curing temperatures must be used in the curing reaction. Polyisocyanates may also be dimerized to form uretdiones that are known to dissociate to free isocyanates on thermal curing. However, once again, high curing temperatures are required.

SUMMARY OF THE INVENTION

The present invention provides for a low temperature (20-70° C.) curable liquid composition comprising:
  a) a polyuretdione prepared from a polyisocyanate,
  b) a polyol, and
  c) and an amine catalyst,
  wherein the catalyst contains the group —N=C—N—, is aprotic, has a pKa greater than 20 and upon addition to the liquid coating composition causes a phase-change of the coating composition from liquid to solid at 25° C. and 1 atm. within one week.

The invention also provides for a process for curing a liquid composition deposited on a substrate comprising:
  a) depositing a coating composition on the substrate,
  b) coalescing the coating composition on the substrate to form the coating,
  c) exposing the coating to a temperature of 20 to 70° C. to cure the coating via a crosslinking reaction,
  wherein the coating composition comprises:
    i polyuretdione prepared from a polyisocyanate,
    ii a polyol, and
    iii an amine catalyst;
    wherein the catalyst contains the group —N=C—N—, is aprotic, has a pKa greater than 20 and upon addition to the liquid coating composition causes a phase-change of the coating composition from liquid to solid at 25° C. and 1 atm. within one week.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Not withstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances:

The term "polymer" is also meant to include copolymer and oligomer.

The basicity of the catalyst is expressed in pKa units. The pKa is determined in acetonitrile solvent. Two (2) bases including the catalyst are used in the determination. The difference in the pKa values is determined by monitoring the equilibria spectrophotometrically via Beer's law. An example of such a method is described in the Journal of Organic Chemistry 2005, 70, 1019-1028.

Acrylic and methacrylic are designated as (meth)acrylic.

Aliphatic and cycloaliphatic are designated as (cyclo)aliphatic.

The uretdiones of the invention are typically obtained by catalytic dimerization of Polyisocyanates by methods which are known in the art.

Examples of suitable polyisocyanates include diisocyanates such as linear aliphatic polyisocyanates, cycloaliphatic polyisocyanates and alkaryl polyisocyanates. Specific examples include 1,4-diisocyanatobutane, 4,4'-diisocyanatocyclohexylmethane (HMDI), isophorone diisocyanate (IPDI), 1,6-diisocyanatohexane (HDI), 1,3- and 1,4-bisisocyanatomethylcyclohexane, 1,3 and 1,4-xylylene diisocyanates (XDI) and mixtures thereof.

Examples of dimerization catalysts are: trialkylphosphines, aminophosphines and aminopyradines such as dimethylaminopyridines, and tris(dimethylamino)phosphine, as well as any other dimerization catalyst known to those skilled in the art.

The result of the dimerization reaction depends, in a manner known to the skilled person, on the catalyst used, on the process conditions and on the polyisocyanates employed. In particular it is possible for products to be formed which contain on average more than one uretdione group per molecule, the number of uretdione groups being subject to a distribution.

Preferred uretdione compounds are prepared from the catalytic dimerization of HDI and/or IPDI.

The uretdiones may optionally contain isocyanurate, biuret, and/or iminooxadiazine dione groups in addition to the uretdione groups.

The uretdiones are NCO-functional compounds and are typically subjected to a further reaction, for example, blocking of the free NCO groups or further reaction of NCO groups with NCO-reactive compounds having a functionality of 2 or more to extend the uretdiones to form polyuretdione prepolymers. This gives compounds containing uretdione groups and of higher molecular weight, which, depending on the chosen proportions, may also contain NCO groups, be free of NCO groups or may contain isocyanate groups that are blocked.

Blocking agents suitable for example are alcohols, lactams, oximes, malonates, alkyl acetoacetates, triazoles, phenols, imidazoles, pyrazoles and amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, caprolactam, N-tert-butylbenzylamine and cyclopentanone including mixtures of these blocking agents.

Example of NCO-reactive compounds with a functionality of two or more are polyols such as those described below. In one embodiment, the NCO-reactive compounds are used in amounts sufficient to react with all free NCO groups in the uretdione. By "free NCO groups" it is meant all NCO groups not present as part of the uretdione ring.

The resulting polyuretidone typically contains at least 2, such as from 2 to 10 uretdione groups. More typically the polyuretidone contains from 5 to 45% uretdlone, 10 to 55% urethane, and less than 2% isocyanate groups. The percentages are by weight based on total weight of resin containing uretdione, urethane, and/or isocyanate.

The polyols useful in the practice can be either low or high molecular weight materials and in general will have average hydroxyl values as determined by ASTM designation E-222-67, Method B, between about 1000 and 10, and preferably between about 500 and 50. The term "polyol" is, meant to include materials having an average of two or more primary hydroxyl groups pet molecule.

The polyols include low molecular weight diols, triols and higher alcohols and polymeric polyols such as polyester polyols, polyether polyols polyurethane polyols and hydroxy-containing (meth)acrylic polymers.

The low molecular weight diols, triols and higher alcohols useful in the instant invention are known in the art. For the most part they are monomeric and have hydroxy values of 200 and above, usually within the range of 1500 to 200. Such materials include aliphatic polyols, particularly alkylene polyols containing from 2 to 18 carbon atoms. Examples include ethylene glycol, 1,4-butanediol, 1,6-hexanediol; cycloaliphatic polyols such as cyclohexane dimethanol. Examples of triols and higher alcohols include trimethylol propane and pentaerythritol. Also useful are polyols containing either linkages such as diethylene glycol and triethylene glycol.

The most suitable polymeric polyols are those having hydroxyl values less than 200, such as 10 to 180. Examples of polymeric polyols include polyalkylene ether polyols, polyester polyols including hydroxyl-containing polycaprolactones, hydroxy-containing (meth)acrylic polymers, polycarbonate polyols and polyurethane polymers.

Examples of polyether polyols are poly(oxytetramethylene) glycols, poly(oxyethylene) glycols, and the reaction product of ethylene glycol with a mixture of propylene oxide and ethylene oxide.

Also useful are polyether polyols formed from the oxyalkylation of various polyols, for example, glycols such as ethylene glycol, 1,4-butane glycol, 1,6-hexanediol, and the like, or higher polyols, such as trimethylol propane, pentaerythritol and the like. One commonly utilized oxyalkylation method is by reacting a polyol with an alkylene oxide, for example, ethylene oxide in the presence of an acidic or basic catalyst.

Polyester polyols can also be used as a polymeric polyol component in the practice of the invention. The polyester polyols can be prepared by the polyesterification of organic polycarboxylic acids or anhydrides thereof with organic polyols. Usually, the polycarboxylic acids and polyols are aliphatic or aromatic dibasic acids and diols.

The diols which are usually employed in making the polyester include alkylene glycols, such as ethylene glycol and butylene glycol, neopentyl glycol and other glycols such as cyclohexane dimethanol, caprolactone diol (for example, the reaction product of caprolactone and ethylene glycol), polyether glycols, for example, poly(oxytetramethylene) glycol and the like. However, other diols of various types and, as indicated, polyols of higher functionality can also be utilized. Such higher polyols can include, for example, trimethylol propane, trimethylol ethane, pentaerythritol, and the like, as well as higher molecular weight polyols such as those produced by oxyalkylating low molecular weight polyols. An example of such high Molecular weight polyol is the reaction product of 20 moles of ethylene oxide per mole of trimethylol propane.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid (where acids are referred to above, it is understood that the anhydrides of those acids which form anhydrides can be used in place of the acid). Also, lower alkyl esters of acids such as dimethyl glutamate can be used.

Besides polyester polyols formed from polybasic acids and polyols, polycaprolactone-type polyesters can also be employed. These products are formed from the reaction of a cyclic lactone such as epsilon-caprolactone with a polyol with primary hydroxyls such as those mentioned above. Such products are described in U.S. Pat. No. 3,169,949 to Hostettler.

In addition to the polyether and polyester polyols, hydroxy-containing (meth)acrylic polymers or (meth)acrylic polyols can be used as the polyol component.

Among the (meth)acrylic polymers are polymers of about 2 to 20 percent by weight primary hydroxy-containing vinyl monomers such as hydroxyalkyl acrylate and methacrylate having 2 to 6 carbon atoms in the alkyl group and 80 to 98 percent by weight of other ethylenically unsaturated copolymerizable materials such as alkyl(meth)acrylates; the percentages by weight being based on the total weight of the monomeric charge.

Examples of suitable hydroxy alkyl(meth)acrylates are hydroxy ethyl and hydroxy butyl(meth)acrylate.

Examples of suitable alkyl acrylates and (meth)acrylates are lauryl methacrylate, 2-ethylhexyl methacrylate and n-butyl acrylate.

Besides the acrylates and methacrylates, other copolymerizable monomers which can be copolymerized with the hydroxyalkyl (meth)acrylates are ethylenically unsaturated materials such as monoolefinic and diolefinic hydrocarbons, halogenated monoolefinic and diolefinic hydrocarbons, unsaturated esters of organic and inorganic acids, amides and esters of unsaturated acids, nitriles and unsaturated acids and the like. Examples of such monomers include styrene, 1,3-butadiene, acrylamide, acrylonitrile, alpha-methyl styrene, alpha-methyl chlorostyrene, vinyl butyrate, vinyl acetate, alkyl chloride, divinyl benzene, diallyl itaconate, triallyl cyanurate and mixtures thereof. Usually these other ethylenically unsaturated materials are used in admixture with the above-mentioned acrylates and methacrylates.

Besides the above-mentioned polymeric polyols, polyurethane polyols. These polyols can be prepared by reacting any of the above-mentioned polyols with a minor amount of polyisocyanate (OH/NCO equivalent ratio greater than 1:1) so that free primary hydroxyl groups are present in the product. In addition to the high molecular weight polyols mentioned above, mixtures of both high molecular weight and low molecular weight polyols such as those mentioned above may be used.

The organic isocyanate which is used to prepare the polyurethane polyols can be organic polyisocyanates having a molecular weight of 140 to 1500, preferably 168 to 318, such as 4,4'-diisocyanatocyclohexylmethane (HMDI), hexamethylene diisocyanate (HDI), 1-methyl-2,4(2,6)-diisocyanato-cyclohexane or 1-isocyanato-3,3,5-trimethyl-5-isocyanatomethyl-cyclohexane (IPDI) and mixtures thereof, preferably 4,4'-diisocyanatocyclohexylmethane (HMDI), 2,4- and/or 2,6-diisocyanato-toluene (TDI), 1-methyl-2,4, and/or -2,6-diisocyanatocyclohexane and 4,4'-diisocyanatodiphenylmethane (MDI), xylylene diisocyanate, tetra-methylene diisocyanate, 1,4-diisocyantobutane, 1,12-diisocyanatododecane, 2,3,3-trimethylhexamethylene diisocyanate, 1,4-cyclohexylene diisocyanate, 4,4'-dicyclohexylmethane diisocyanate, 4,4'-dicyclohexyl diisocyanate, α, α, α', α'-tetramethyl-m- or p-xylylene diisocyanate, and triphenylmethane 4,4',4"-triisocyanate as well as mixtures thereof. Also suitable are monomeric triisocyanates such as 4-isocyanatomethyl-1,8-b octamethylene diisocyanate. The polyisocyanate component may also contain known lacquer polyisocyanates based on HDI, IPDI and/or HMDI.

In accordance with the present invention the polyisocyanate component may be in the form of a polyisocyanate adduct. Suitable polyisocyanate adducts are those containing isocyanurate, uretdione, biuret, iminooxadiazine dione, carbodiimide and/or oxadiazinetrione groups. The polyisocyanates adducts have an average functionality of 2 to 6, preferably 2 to 4, and an NCO content of 5 to 30% by weight, preferably 10 to 25% by weight and more preferably 15 to 25% by weight, and include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines.

4) Iminooxadiazine dione and optionally isocyanurate group-containing polyisocyanates which may be prepared in the presence of special fluorine-containing catalysts as described in DE-A 19611849.

5) Carbodiimide group-containing polyisocyanates which may be prepared by oligomerizing di- or polyisocyanates in the presence of known carbodiimidization catalysts as described in DE-PS1,092,007, U.S. Pat. No. 3,152,162 and DE-OS 2,504,400, 2,537,685 and 2,552,350.

6) Polyisocyanates containing oxadiazinetrione groups, e.g., the reaction product of two moles of a diisocyanate and one mole of carbon dioxide.

Preferred polyisocyanate adducts are those containing isocyanurate, uretdione, biuret, and/or iminooxadiazine dione groups, especially polyisocyanates containing isocyanurate groups and optionally uretdione or iminooxadiazine dione groups.

The catalyst for the curing reaction is an amine compound contains the group —N═C—N—, is aprotic, has a pKa greater than 20 and upon addition to the liquid coating composition causes a phase-change of the coating composition from liquid to solid at 25° C. and 1 atm. within one week. As used herein and in the following claims, "aprotic" means there is no hydrogen bonded to a primary or secondary amine.

In one embodiment, the catalyst has a structure according to formula I:

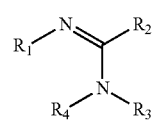

(I)

wherein $R_1$ represents linear or branched alkyl, preferably t-butyl, or in combination with $R_4$, is a connecting segment selected from the group consisting of ${+}N{=}CH{+}$ and

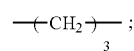

$R_2$ represents H, linear or branched alkyl, preferably methyl, dimethylamine, or in combination with $R_3$ is a connecting segment selected from the group consisting of

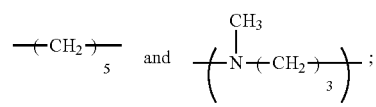

$R_3$ represents Na, linear or branched alkyl, preferably methyl, or in combination with $R_2$, is a connecting segment selected from the group consisting of

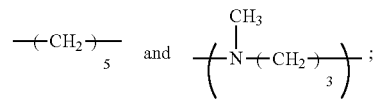

R₄ represents linear or branched alkyl, preferably methyl, or in combination with R₁, is a connecting segment selected from the group consisting of ─(─N═CH─)─ and

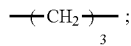

and
and wherein R₁ and R₄ may together form an N-heterocyclic ring, and R₂ and R₃ may together form an N-heterocyclic ring.

Suitable catalysts include those selected from the group consisting of 1,8-diazabicyclo[5.4.0]undec-7ene, 7-methyl-1,5,7-triazabicyclo[4.4.0]dec-5ene, 1,4,5,6-tetrahydro-1,2-dimethyl pyrimidine, 1,2,4-triazole, sodium derivative and 2-tert-butyl-1,1,3,3-tetramethylguanidine.

Although not intending to be bound by any theory, it is believed that the strong basic catalyst promotes crosslinking via reaction of the hydroxyl with the uretdione linkages resulting in the formation of allophanate crosslinks as opposed to the more conventional high temperature reaction of the uretdiones dissociating to form free isocyanate groups that react with the hydroxyl groups to form urethane crosslinks. With the proper catalyst the allophanate group formation occurs at a temperature of 20 to 70° C. such as 20 to 35° C.

The relative amounts of the polyuretdione and the polyol can vary somewhat depending on their respective molecular weights. Typically they can each be present in amounts within the range of 10 to 90% by weight based on resin solids weight of the polyuretidione and the polyol. The equivalent ratio of hydroxyl to uretidione is typically from 0.5 to 1.5:1. The catalyst is typically present in the composition in amounts of about 0.05 to 5% by weight based on weight of resin solids weight of the polyuretidione and the polyol.

In addition to the ingredients mentioned the composition above may contain various optional ingredients. Examples of these are fillers and reinforcing agents, for example calcium carbonate, silicates, talc, kaolin, mica and barium sulfate. Other additives, for example plasticizers, lubricants and rheological additives and solvent or diluent may be included in the compositions. When present, these optional ingredients may constitute up to 50% by weight of the composition based on total weight of the composition.

The compositions of the present invention also contain a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benz-imidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions cart also be, produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application. No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086; incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the primer of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The composition of the invention can be employed for various purposes, for example as printing inks and as coatings for paper, wood, metal or plastic.

Of particular interest is the use of the compositions of the invention for preparing protective and decorative coatings, such as exterior coatings on substrates of all kinds, for example buildings, fences, chipboard panels, and as a coating on stone, concrete or metal, for the coating of vehicles, for example, such as cars, railways or aircraft. The compositions may likewise be used in automotive OEM finishing and automotive refinish, and also for the finishing of car bodies, plastic parts for cars and body-mounted car parts. The initiators of the invention can be used in a multicoat system in the primer, base coat or clearcoat. Their use in pigmented topcoats is also possible.

The substrates can be coated by applying the composition as a liquid that may be 100% solids composition or as a solution or dispersion in a solvent or diluent. The choice of solvent or diluent and the concentration depend predominantly on the choice of coating ingredients and the coating process. The solvent or diluent should be inert. In other words, it should not undergo any chemical reaction with the components and should be capable of being removed after the coating operation in the curing process. Examples of suitable solvents or diluents are ketones, ethers and esters, such as methyl ethyl ketone, isobutyl methyl ketone, cyclopentanone, cyclohexanone, N-methylpyrrolidone, dioxane, tetrahydrofuran, 2-methoxyethanol, 2-ethoxyethanol, 1-methoxy-2-propanol, 1,2-dimethoxyethane, ethyl acetate, n-butyl acetate and ethyl 3-ethoxypropionate. The solvent or diluent is typically present in amounts of 0 to 30% by weight based on total weight of the composition.

Using known coating processes, the coating composition may be applied uniformly to a substrate, for example by spin coating, dip coating, knife coating, curtain coating, brushing, spraying—especially electrostatic spraying—and reverse roll coating. The coating compositions can be used as a primer, color coat or as a clearcoat.

After application of the composition to the substrate, the resultant coating is cured. Cure can be at ambient temperature or slightly above, typically from 20 to 70° C. and 20 to 35° C.

The coating thickness is typically from 0.5 to 46 microns.

EXAMPLES

Materials

Uretdiones:

("EtHex Dimer") A polyuretdione prepolymer prepared from Desmodur® N 3400 (polyisocyanate having uretdione and isocyanurate groups, prepared from HDI, available from Bayer MaterialScience LLC, Pittsburgh, Pa.) /2-ethyl-1,3-hexanediol/2-ethyl hexanol was prepared using a diol to monol equivalent ratio of 2.8:1 in sufficient amount to substantially consume any free isocyanate groups present. The resin was prepared at 50% solids in butyl acetate (BA), having a 1430 average uretdione equivalent weight.

("TMPD Dimer") A polyuretdione prepolymer prepared from Desmodur® N 3400 (polyisocyanate having uretdione and isocyanurate groups, prepared from HDI, available from Bayer MaterialScience LLC, Pittsburgh, Pa.) /2,2,4-trimethyl-1,3-pentanediol (TMPD)/2-ethyl hexanol was prepared using a diol to monol equivalent ratio of 2.8:1 in sufficient amount to substantially consume any free isocyanate groups present. The resin was prepared at 50% solids in BA, having a 1430 average uretdione equivalent weight.

Polyols:

Acrylic Polyol: (PA) Acrylic polyol from PPG Industries, produced in accordance with Example A below Desmophen® XP 2586: (PC) Polycarbonate polyol from Bayer MaterialScience, 100% solids, 500 average hydroxyl equivalent weight. During the course of this study, this was renamed Desmophen C 2100.

Desmophen® S-1019-120: (PE) Polyester polyol from Bayer MaterialScience, 100% solids, 500 average hydroxyl equivalent weight Catalysts 1-methylimidazole, 99%: (MeIm) from Sigma Aldrich, 100% solids, 1.03 g/mL.

1,8-diazabicyclo(5.4.0)-undec-7-ene: (DBU) from Air Products, 100% solids, 1.02 g/mL.

1,5-diazabicyclo(4.3.0)-non-5-ene: (DBN) from Sigma Aldrich, 100% solids, 1.12 g/mL.

7-methyl-1,5,7-triazabicyclo(4.4.0)-dec-5-ene: (MeTBD) from Fluka, 100% solids, 1.07 g/mL.

2,3-dimethyltetrahydropyrimidine: (Addocat® 1872) from Rhein Chemie, 100% solids, 0.96 g/mL.

1,5,7-triazabicyclo(4.4.0)-dec-5-ene: (TBD) from Sigma Aldrich, 100% solids, 0.78 g/mL.

1,4-diazabicyclo(2.2.2)-octane: (DBO) from Sigma Aldrich, powder Benzyltrimethylammonium hydroxide solution: (Triton® B) from Sigma Aldrich, 40% solids in methanol, 019 g/mL.

Stannous octoate: (T-9) from Acros, 100% solids, 1.29 g/mL.

Dibutyltin dilaurate: (T-12) from Air Products, 100% solids, 1.03 g/mL.

Tributyl phosphine: (TBP) from Sigma Aldrich, 100% solids, 0.81 g/mL.

Zirconium (IV) acetylacetonate: (Zirc AcAc) from Sigma Aldrich, powder.

Zinc diethyldithiocarbamate: (Zinc DEDTC) from Sigma Aldrich, powder.

Nacure A218: metal salt from King Industries, Inc, 25% solids in n-butanol, 1.01 g/mL.

Tetrabutylphosphonium methane-sulfonate: (TBPMe-S) from Sigma Aldrich, 100% solids, 0.78 g/mL.

Tetrabutylammonium acetate, 97%: (tBAmAc) from Sigma Aldrich, powder.

Potassium tert-butoxide: (K-tBox) from Sigma Aldrich, powder.

1,2,4-triazole, sodium derivative: (triazole) from Sigma Aldrich, powder.

Dodecylbenzenesulfonic acid: (Nacure® 5076) from King Industries, Inc, 70% solids in isopropanol, 0.99 g/mL.

1,1,1,3,3,3-hexamethyldisilazane, 97%: (HMeDSi) from Sigma Aldrich, 100% solids, 0.78 g/mL.

K-Kat XC 6212: (6212) Zirconium chelate from King Industries, 100% solids.

K-Kat XK 605: (605) Aqueous solution of zinc compound with amine from King Industries, 80% solids in water.

Nacure® XC 8212: (8212) Zinc complex with an amine blocked sulfonic acid from King Industries, 52% solids in isopropanol.

Borchi® Kat 22: (K22) Zinc octoate from Lanxess, 100% solids.

Addocat® PP: (PP) Tertiary aliphatic amine blend from Rhein Chemie, 100% solids, 2-tert-butyl-1,1,3,3-tetramethylguanidine: (TMG) from Fluka, 100% solids.

Solvents:
  Butyl Acetate (nBA)
  Dimethyl sulfoxide (DMSO)
  Tertiary butanol (tBuOH)
  Toluene Example A Acrylic Polyol This example illustrates the preparation of an acrylic polyol component. A reaction vessel equipped stirrer, thermocouple, condenser and addition funnels equipped with pumps is charged with 269.2 grams (g) of ethyl-3-ethoxy propionate (EktaPro EEP from Eastman Chemical Products), 15.2 g n-butyl acetate and 5.5 g triphenyl phosphite and heated to reflux, about 160° C. Two feeds, identified herein as A and B, are next gradually added to the vessel over a period of three and four hours, respectively, while the contents of the vessel are maintained at reflux conditions. Feed A consists of a mixture of 548.6 g Tone M-201 (caprolactone methacrylate), 274.4 g methyl methacrylate and 274.4 g styrene. Feed B consists of a mixture of 65.8 g Luperox® DTA (free radical initiator from Atochem) and 24.3 g n-butyl acetate. After the addition of the two feeds A and B is complete the addition funnels were rinsed with 30.0 g each of n-butyl acetate and the contents of the vessel are allowed to reflux for 1 hour. Thereafter, heating is discontinued, the contents of the vessel are allowed to cool and 150.0 g n-butyl acetate is added.

The resultant acrylic polyol has a total solids content measured for 1 hour at 110° C. of 65.8 percent by weight; has a peak molecular weight of 6600, a weight average molecular weight of 10,200 and a number average molecular weight of 2016 as determined by gel permeation chromatography utilizing a polystyrene standard; has a Gardner-Holt viscosity of Z; has an acid value of 1.1; has a APHA color of 20; has a weight/gallon of 8.80; has a hydroxyl value of 83.3.

Preparation of Raw Materials

Both uretdione prepolymers and all three polyols used in the Examples were reduced to 40% solids with nBA. Catalysts were prepared as 10% solutions based on solids in various carrier solvents as indicated in Table 1. Names and abbreviations of the catalysts that were used in the Examples are found in Table 1 as well.

Procedure:

After preparation of raw materials, uretdione prepolymers and polyols were mixed in an 8-mL vial followed by addition of catalyst. Catalysts were added at 4% loading based on solids. As an example, to prepare a formulation from EtHex uretdione and PA polyol at uretdione to hydroxyl ratio of 0.8:1.0 with DBU catalyst, 3,000 μL of EtHex uretdione solution, 1,440 μL of PA polyol solution were mixed first. Then, 782 μL of DBU solution was added on top of the uretdione and polyol mixture. Formulations were observed and the responses were recorded as follows:

0=no reactivity, no gelling or viscosity increase noticed after one week
  1=low reactivity, formulation gelled within one week
  2=medium reactivity, formulation gelled over night
  3=high reactivity, formulation gelled prior to casting over substrate

TABLE 1

Catalyst identification and carrier solvent.

| Catalyst Number | Catalyst | Abbreviation | Solvent |
|---|---|---|---|
| 1 | Metal salt | Nacure® A218 | nBA |
| 2 | Dodecylbenzenesulfonic acid | Nacure® 5076 | nBA |
| 3 | 1-methylimidazole | MeIm | nBA |
| 4 | Tetrabutylphosphonium methanesulfonate | TBPMe-S | nBA |
| 5 | Stannous octoate | T-9 | nBA |
| 6 | Dibutyltin dilaurate | T-12 | nBA |
| 7 | 1,8-diazabicyclo(5.4.0)-undec-7-ene | DBU | nBA |
| 8 | 1,5-diazabicyclo(4.3.0)-non-5-ene | DBN | nBA |
| 9 | 7-methyl-1,5,7-triazabicyclo(4.4.0)-dec-5-ene | MeTBD | nBA |
| 10 | 1,1,1,3,3,3-hexamethyldisilazane | HMeDSi | nBA |
| 11 | 2,3-dimethyltetrahydropyrimidine | 1872 | nBA |
| 12 | Tributyl phosphine | TBP | nBA |
| 13 | Tetrabutylammonium acetate | tBAmAc | tBuOH |
| 14 | Potassium tert-butoxide | K-tBox | tBuOH |
| 15 | 1,5,7-triazabicyclo(4.4.0)-dec-5-ene | TBD | tBuOH |
| 16 | 1,4-diazabicyclo(2.2.2)-octane | DBO | nBA |
| 17 | Zirconium (IV) acetylacetonate | ZircAcAc | Toluene |
| 18 | Zinc diethyldithiocarbamate | Zinc-DEDTC | DMSO |
| 19 | Benzyltrimethylammonium hydroxide solution | Triton® B | nBA |
| 20 | 1,2,4-triazole, sodium derivative | triazole | DMSO |
| 21 | K-Kat XC 6212 | 6212 | BA |
| 22 | K-Kat XK 605 | 605 | water |
| 23 | Nacure® XC 8212 | 8212 | BA |
| 24 | Borchi® Kat 22 | K22 | BA |
| 25 | Addocat® PP | PP | BA |
| 26 | 2-tert-butyl-1,1,3,3-tetra methyl guanidine | TMG | BA |

Table 2 and Table 3 show the formulation responses of each catalyst with the uretdione to polyol equivalents of 0.8:1.0 and 1.2:1.0 respectively. It is clearly seen from Table 2 and Table 3 that the most active catalysts are triazole, 1872, DBU, and MeTBD.

Table 4 shows catalyst responses at uretdione to polyol equivalent ratio of 1.0:1.0. In addition to triazole, 1872, DBU, MeTBD; TMG looks like a strong catalyst.

TABLE 2

Formulation response to catalyst at room temperature at uretdione:hydroxyl equivalent ratio of 0.8:1.0

| Catalyst Number | Catalyst | Solvent | EtHex Dimer | | | TMPD Dimer | | |
|---|---|---|---|---|---|---|---|---|
| | | | PA | PC | PE | PA | PC | PE |
| 1 | Nacure® A 218 | nBA | 0 | 0 | 0 | 0 | 0 | 0 |
| 2 | Nacure® 5076 | nBA | 0 | 0 | 0 | 0 | 0 | 0 |
| 3 | MeIm | nBA | 0 | 0 | 0 | 0 | 0 | 0 |
| 4 | TBPMe-S | nBA | 0 | 0 | 0 | 0 | 0 | 0 |
| 5 | T-9 | nBA | 0 | 0 | 0 | 0 | 0 | 0 |
| 6 | T-12 | nBA | 1 | 0 | 0 | 0 | 0 | 0 |
| 7 | DBU | nBA | 3 | 3 | 3 | 2 | 2 | 2 |
| 8 | DBN | nBA | 0 | 0 | 0 | 0 | 0 | 0 |
| 9 | MeTBD | nBA | 3 | 2 | 2 | 3 | 2 | 2 |
| 10 | HMeDSi | nBA | 0 | 0 | 0 | 0 | 0 | 0 |
| 11 | 1872 | nBA | 3 | 3 | 3 | 3 | 2 | 2 |
| 12 | TBP | nBA | 0 | 0 | 0 | 0 | 0 | 0 |
| 13 | tBAmAc | tBuOH | 2 | 1 | 1 | 1 | 0 | 0 |
| 14 | K-tBox | tBuOH | 0 | 0 | 0 | 0 | 0 | 0 |
| 15 | TBD | tBuOH | 1 | 0 | 0 | 1 | 0 | 0 |
| 16 | DBO | nBA | 1 | 0 | 0 | 1 | 0 | 0 |

TABLE 2-continued

Formulation response to catalyst at room temperature at uretdione:hydroxyl equivalent ratio of 0.8:1.0

| Catalyst | | | EtHex Dimer | | | TMPD Dimer | | |
|---|---|---|---|---|---|---|---|---|
| Number | Catalyst | Solvent | PA | PC | PE | PA | PC | PE |
| 17 | ZircAcAc | Toluene | 2 | 0 | 0 | 1 | 0 | 0 |
| 18 | Zinc-DEDTC | DMSO | 0 | 0 | 0 | 0 | 0 | 0 |
| 19 | Triton® B | nBA | 1 | 0 | 0 | 1 | 0 | 0 |
| 20 | triazole | DMSO | 3 | 3 | 3 | 3 | 3 | 3 |

TABLE 3

Formulation response to catalyst at room temperature at uretdione:hydroxyl equivalent ratio of 1.2:1.0

| Catalyst | | | EtHex Dimer | | | TMPD Dimer | | |
|---|---|---|---|---|---|---|---|---|
| Number | Catalyst | Solvent | PA | PC | PE | PA | PC | PE |
| 1 | Nacure® A 218 | nBA | 0 | 0 | 0 | 0 | 0 | 0 |
| 2 | Nacure® 5076 | nBA | 0 | 0 | 0 | 0 | 0 | 0 |
| 3 | MeIm | nBA | 0 | 0 | 0 | 0 | 0 | 0 |
| 4 | TBPMe-S | nBA | 0 | 0 | 0 | 0 | 0 | 0 |
| 5 | T-9 | nBA | 0 | 0 | 0 | 0 | 0 | 0 |
| 6 | T-12 | nBA | 1 | 0 | 0 | 0 | 0 | 0 |
| 7 | DBU | nBA | 3 | 3 | 3 | 2 | 2 | 2 |
| 8 | DBN | nBA | 0 | 0 | 0 | 0 | 0 | 0 |
| 9 | MeTBD | nBA | 3 | 2 | 2 | 3 | 2 | 2 |
| 10 | HMeDSi | nBA | 0 | 0 | 0 | 0 | 0 | 0 |
| 11 | 1872 | nBA | 3 | 3 | 3 | 3 | 2 | 2 |
| 12 | TBP | nBA | 0 | 0 | 0 | 0 | 0 | 0 |
| 13 | tBAmAc | tBuOH | 2 | 1 | 1 | 1 | 0 | 0 |
| 14 | K-tBox | tBuOH | 0 | 0 | 0 | 0 | 0 | 0 |
| 15 | TBD | tBuOH | 1 | 0 | 0 | 1 | 0 | 0 |
| 16 | DBO | nBA | 1 | 0 | 0 | 1 | 0 | 0 |
| 17 | ZircAcAc | Toluene | 2 | 0 | 0 | 1 | 0 | 0 |
| 18 | Zinc-DEDTC | DMSO | 0 | 0 | 0 | 0 | 0 | 0 |
| 19 | Triton® B | nBA | 1 | 0 | 0 | 1 | 0 | 0 |
| 20 | triazole | DMSO | 3 | 3 | 3 | 3 | 3 | 3 |

TABLE 4

Formulation response to catalyst at room temperature at uretdione:hydroxyl equivalent ratio of 1.0:1.0

| | | | EtHex Dimer | |
|---|---|---|---|---|
| Catalyst Number | Catalyst | Solvent | PA | PE |
| 7 | DBU | BA | 3 | 2 |
| 9 | MeTBD | BA | 3 | 1 |
| 11 | 1872 | BA | 3 | 1 |
| 21 | 6212 | BA | 0 | 0 |
| 22 | 605 | water | 0 | 0 |
| 23 | 8212 | BA | 0 | 0 |
| 24 | K22 | BA | 0 | 0 |
| 25 | PP | BA | 0 | 0 |
| 26 | TMG | BA | 2 | 0 |

Example 1

Coating Composition

| | Total Mass |
|---|---|
| BYK-300[1] | 0.10 |
| Acrylic polyol of Example A | 47.9 |
| 7-methyl-1,5,7triazabicyclo[4.4.0]dec-5-ene[2] | 1.0 |
| Polyuretdione Solution[3] | 51.0 |
| | 100.00 |

[1]Flow additive available from BYK-CHEMIE (52% weight solids in Xylene and isobutanol).
[2]7-methyl-1,5,7triazabicyclo[4.4.0]dec-5-ene from Sigma-Aldrich (100% weight solids).
[3]Polyuretidione from Bayer Material Science, Inc. prepared from Desmodur® N3400, 2-ethylhexanol and 2-ethyl-1,3-hexanediol; the solids content was 50% in n-butyl acetate; the uretdione equivalent weight as supplied was 1341.

The coating composition of Example 1 was diluted to 40.5% weight solids by the addition of n-Butyl acetate solvent. The sample was applied using a #8 square draw down bar on pre-coated E-Coat 6061 primed cold rolled steel panels available from ACT Test Panels, Inc. of Hillsdale, Mich. The sample was cured for 30 minutes at ambient temperature. The sample was also tested after curing for 30 minutes at 60° C. The results of the testing are reported below.

Example 2

Coating Composition

| | Total Mass |
|---|---|
| BYK-300 | 0.10 |
| Acrylic polyol of Example A | 43.2 |
| 7-methyl-1,5,7triazabicyclo[4.4.0]dec-5-ene | 1.0 |
| Vestagon BF 1320 Solution[1] | 55.8 |
| | 100.00 |

[1]Polyuretidione from Degussa Corporation (40% solids).

Example 2 formula was made and diluted to 35.4% weight solids by the addition of n-Butyl acetate solvent. The sample was applied using a #8 square draw down bar on pre-coated E-Coat 6061 primed cold rolled steel panels available from ACT Test Panels, Inc. of Hillsdale, Mich. The sample was cured for 30 minutes at ambient temperature. The sample was also tested after curing for 30 minutes at 60° C. The results of the testing are reported below.

| EXAMPLE | Surface Tack[1] (24 hrs. Ambient) | Surface Tack[1] (30'@ 60° C.) | MEK Double Rubs[2] (24 hrs. Ambient) | MEK Double Rubs (30'@ 60° C.) |
|---|---|---|---|---|
| Example 1 | Slight | Tack-free | 50 slight mar | 50 |
| Example 2 | Tack-free | Tack-free | 200 | 200 |

[1]ASTM D2377-00 (2006)
[2]ASTM D4752

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. A liquid coating composition that cures at 20-70° C. comprising:
   a) a polyuretdione prepared from a polyisocyanate,
   b) a polyol, and
   c) an amine catalyst,
   wherein the catalyst contains the group

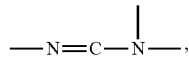

is aprotic, has a pKa greater than 20 and upon addition to the liquid coating composition causes a phase-change of the coating composition from liquid to solid at 25° C. and 1 atm. within one week.

2. The composition of claim 1 wherein
   a) is present in amounts of 10 to 90% by weight, and
   b) is present in amounts of 10 to 90% by weight;
   the % by weight being based on total weight of a) and b).

3. The composition of claim 1 wherein the amine catalyst is present in amounts of 0.05 to 5% by weight.

4. The composition of claim 1, wherein the amine catalyst has a structure according to formula I:

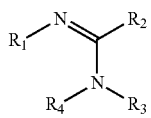

wherein $R_1$ represents linear or branched alkyl, preferably t-butyl, or in combination with $R_4$, is a connecting segment selected from the group consisting of $-(N=CH)-$ and

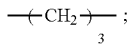

$R_2$ represents H, linear or branched alkyl, preferably methyl, dimethylamine, or in combination with $R_3$ is a connecting segment selected from the group consisting of

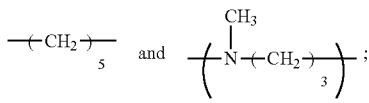

$R_3$ represents Na, linear or branched alkyl, preferably methyl, or in combination with $R_2$, is a connecting segment selected from the group consisting of and

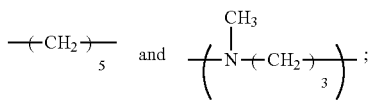

$R_4$ represents linear or branched alkyl, preferably methyl, or in combination with $R_1$, is a connecting segment selected from the group consisting of $-(N=CH)-$ and

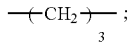

and
   and wherein $R_1$ and $R_4$ may together form an N-heterocyclic ring, and $R_2$ and $R_3$ may together form an N-heterocyclic ring.

5. The composition of claim 1 wherein the amine catalyst is selected from the group consisting of 1,8-diazabicyclo[5.4.0]undec-7ene, 7-methyl-1,5,7-triazabicyclo[4.4.0]dec-5-ene, 1,4,5,6-tetrahydro-1,2-dimethylpyrimidine, 1,2,4-triazole, sodium derivative and 2-tert-butyl-1,1,3,3-tetramethylguanidine.

6. The composition of claim 1 wherein the polyuretdione is prepared by reaction of a uretdione group containing polyisocyanate with at least one polyol an optionally a blocking agent for isocyanate.

7. The composition of claim 1 wherein the polyuretdione contains from 5 to 45% by weight of uretdione groups; 10 to 55% by weight urethane groups and less than 2% by weight free isocyanate groups the percentage by weight being based in total weight of resin containing uretdione, urethane, and/or isocyanate groups.

8. The composition of claim 1 wherein the polyisocyanate contains from 4 to 20 carbon atoms.

9. The composition of claim 7 wherein the polyisocyanate is a (cyclo)aliphatic polyisocyanate.

10. The composition of claim 1 wherein the polyisocyanate is a diisocyanate.

11. The composition in claim 1 wherein the polyisocyanate is selected from the group consisting of 1,6-hexamethylene diisocyanate, isophorone diisocyanate and mixtures thereof.

12. The composition of claim 1, wherein the polyuretdione contains one or more groups consisting of isocyanurate, biuret, and iminooxadiazine dione groups.

13. The composition of claim 1 wherein the polyol is a polymeric polyol having a hydroxyl value of 10 to 180.

14. The composition of claim 13 wherein the polymeric polyol is selected from a polyether polyol, a polyester polyol, a polyurethane polyol, a hydroxy-group-containing (meth)acrylic polymer and a polycarbonate polyol.

* * * * *